Jan. 17, 1961  H. L. WOLFE  2,968,278
METHOD AND APPARATUS FOR COATING CONTINUOUS FIBERS
Filed July 7, 1955  2 Sheets-Sheet 1

INVENTOR.
Homer L. Wolfe
BY
Nobbe & Swope
ATTORNEYS

INVENTOR.
Homer L. Wolfe
BY
Nobbe & Swope
ATTORNEYS

United States Patent Office 2,968,278
Patented Jan. 17, 1961

2,968,278

METHOD AND APPARATUS FOR COATING CONTINUOUS FIBERS

Homer L. Wolfe, Parkersburg, W. Va., assignor, by mesne assignments, to Johns-Manville Fiber Glass Inc., Cleveland, Ohio, a corporation of Delaware Filed July 7, 1955, Ser. No. 520,523

2 Claims. (Cl. 118—257)

This invention relates to the application of liquid materials to the surfaces of continuous fibers.

More particularly, this invention relates to a method and apparatus for applying liquid materials to the surfaces of continuous glass fibers.

In a still further aspect this invention relates to a method and apparatus for applying liquid materials to the surfaces of individual glass fibers before such fibers are gathered into strand form.

In another aspect this invention relates to an apparatus for applying liquid materials to continuous glass fibers which employs a moving belt as a carrying medium for liquid materials to be applied to the fibers.

The commercial production of continuous glass fibers has in the past been accompanied by coating difficulties which have limited the breadth of their application. Continuous glass fibers are conventionally produced by drawing a plurality of small streams from a supply body of molten glass at a high rate of speed. The body of molten glass is contained within a suitably shaped melting chamber having a series of orifices at its base through which the small streams are exuded by gravity. By applying a high speed pulling force to the streams, they are drawn out into continuous fine fibers. The plurality of fibers are caused to converge over some type of guiding element into a strand. Heretofore it has been conventional practice to gather the fibers over a small V-shaped felt pad to which a liquid treating material is applied. Capillarity of the liquid between the grouped fibers has been depended upon to coat each of the individual fibers. However, due to the fact that some of the fibers in the center of the strand are completely surrounded by neighboring fibers, they are at best only partially coated and in most instances receive no coating at all.

Glass fibers are very abrasive with respect to each other when bare surfaces rub together without some lubricant or sizing material therebetween. Such absence of sizing material over the surfaces of each of the individual fibers has heretofore prevented the use of glass fiber in such applications as rope, binder twines and others since the abrasiveness above described causes such materials to deteriorate quite rapidly upon use. It would therefore constitute an important step forward in the art if a method could be provided whereby each of the individual glass fibers could be positively and uniformly coated with a liquid treating material such as a size, lubricant or the like.

Accordingly it is an object of the present invention to provide a method and apparatus for applying liquid materials to the surfaces of continuous fibers.

It is a further object of the present invention to provide a method and apparatus adapted to the application of liquid materials to the surfaces of continuous glass fibers.

It is another object of the present invention to provide an apparatus for coating a continuous fiber which apparatus employs a continuous, moving belt disposed in tangentially contacting relation with the fiber for the application of a liquid treating material thereto.

Another object is to provide a process for applying liquid materials to continuous fibers wherein a moving film of liquid material is applied in contacting relation in a working zone to the surfaces of the fibers.

Other objects and advantages of the invention will become more apparent during the course of the following description when taken in connection with the accompanying drawings.

In the drawings wherein like numerals are employed to designate like parts throughout the same:

Figure 2:
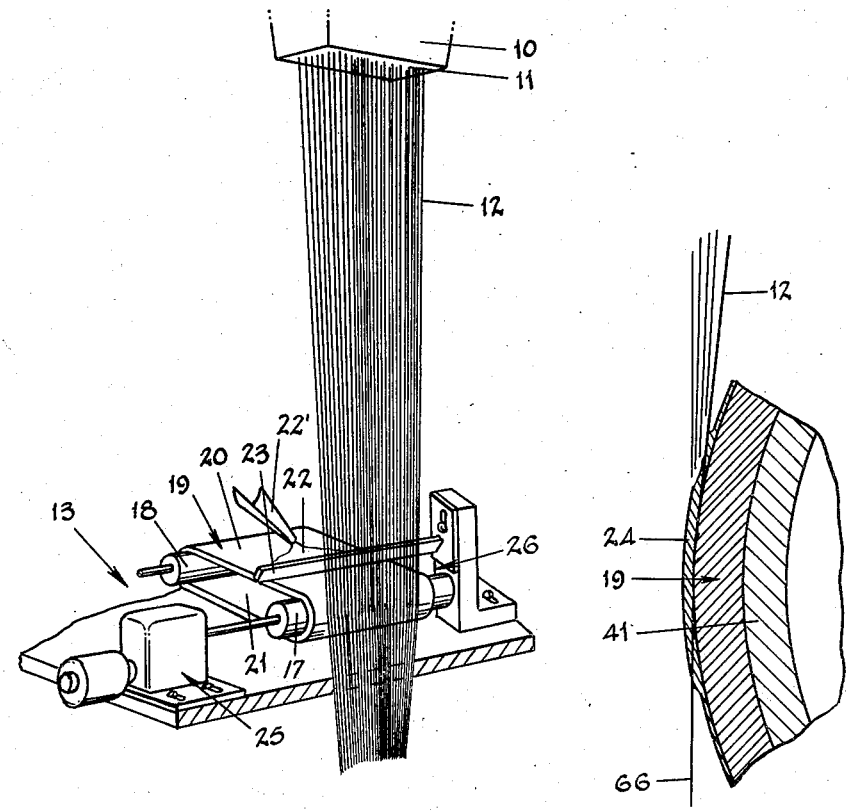
Fig. 2 is an enlarged section view of the apparatus of Fig. 1 showing the manner of tangential contact whereby the fibers are exposed to the moving film of liquid material.

As shown on the drawings, the reference numeral 10 designates a bushing for the production of glass fibers. The bushing 10 comprises an open top vessel adapted to contain a supply body of molten glass and is provided in its base with a plurality of small orifices 11 from which are exuded small streams of glass which are drawn and attenuated into fibers 12. The glass fibers 12 are caused to move downwardly from the bushing 10 in spaced rectilinear direction past coating device 13, thence are caused to converge downwardly by a gathering device 14 and are subsequently wound in strand form onto a rapidly rotating forming tube 15 to provide a package 16.

The coating device 13 includes a pair of rotatable rolls 17 and 18 which are spaced apart and adapted to carry a continuous belt 19. The belt 19 is positioned in a generally horizontal plane with its flights 20 and 21 in parallel relationship and a supply of liquid treating material 22 is adapted to be conducted to and deposited upon the top flight 20 of belt 19. A spreading device 23 is positioned in contacting relationship with the upper surface of the belt 19 to spread the liquid material 22, supplied to the belt from a suitable conduit 22', in a uniform film 24 over the surface of the belt.

The rolls 17 and 18 and the belt 19 as a unit are adapted to be movably driven by means of a motor and gear reducing unit 25 suitably connected to one of the rolls such as, for example, roll 17.

Figures 5, 6:
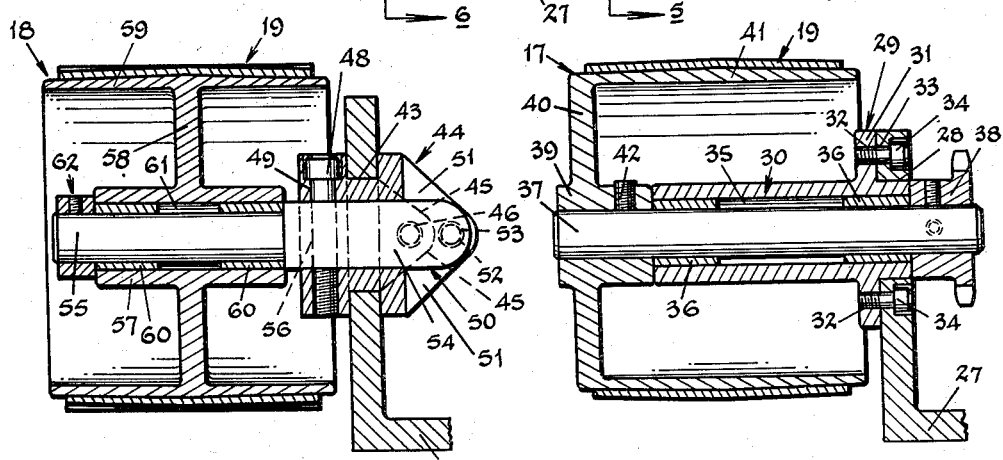
Fig. 5 is a section view taken along the line 5—5 of Fig. 4.
Fig. 6 is a section view taken along the line 6—6 of Fig. 4.

Structural configuration of a specific embodiment of the belt and roll unit 26 is shown in Figs. 3, 4, 5 and 6. Numeral 27 refers to a generally L-shaped support plate upon which the rolls 17 and 18 are adapted to be rotatably journalled. As shown in Fig. 5 plate 27 is provided at its right hand end with an aperture 28 into which the terminal portion 29 of a sleeve unit 30 is adapted to be fitted. Sleeve unit 30 is provided adjacent the said terminal portion 29 with a radially extending flange 31 provided with threaded holes 32 which are adapted to mate with holes 33 in plate 27. Bolts 34 are inserted through the respective plate holes 33 and the aforementioned flange holes 32 to secure the plate 27 and sleeve unit 30 in assembled relationship. Sleeve unit 30 is provided with a longitudinally extending internal bore 35 into the ends of which are pressed sleeved bearing elements 36 adapted to receive a rotatable shaft 37. The right hand end of shaft 37 projects beyond the exterior surface of plate 27 a sufficient distance for the attachment of a sprocket wheel 38 whereby the unit can be chain driven. The other end of shaft 37 projects beyond the left hand end of the sleeve unit 30 a sufficient distance for the attachment of a cup shaped roll 17. Roll 17 comprises a hub 39 and a web 40 supporting a cylindrical belt support surface 41, cast as an integral unit. The hub 39 is fitted with a set screw 42 whereby it is adapted to be secured to shaft 37.

The left hand portion of support plate 27 is provided with a slot 43 wherein a bearing support bracket 44 for roll 18 is adapted to be slidably mounted. The bearing support bracket 44 is of H-shaped cross section and adapted to slide within the slot 43. The terminal portion of slot 43 is provided with a pressed flange 45 which is apertured for receiving a tensioning bolt 46, whereby the roll 18 can be adjusted with respect to roll 17 for tightening the belt 19. Bearing support bracket 44 is provided in its central portion with a rectangular aperture 47. As shown in Fig. 6, a pivot pin 48 is positioned in a vertically disposed hole 49 in H-shaped support member 44, upon which pin an apertured idler roll shaft 50 is adapted to be pivotally mounted. Support member 44 is provided with a pair of spaced lugs 51 which are provided with threaded holes 52 into which adjustment screws 53 are inserted. The idler roll shaft 50 includes a square body portion 54 formed integrally with a shaft portion 55. The square body portion 54 of idler roll shaft 50 is provided with a transverse bore 56 whereby it is pivotally mounted upon the aforementioned pin 48. The terminal portion of the body portion 54 extends through the rectangular aperture 47 and is embraced between the adjusting screws 53 of lugs 51 of H-shaped bearing support member 44. The roll 18 is provided with a hub 57 and central web 58, formed integrally with a cylindrical belt support surface 59. Sleeve bearings 60 are inserted in each end of a bore 61 provided in hub 57 whereby the roll 18 is positioned upon the shaft 55 and secured in operable position by means of a collar and set screw unit 62. It will be seen that by adjustment of the screws 53, alignment of roll 18 with roll 17 can be effected.

The continuous belt 19 of Hycar rubber or other suitable material such as the pliable synthetic resins, or even a rubberized canvas belt if desired, is mounted upon the rolls 17 and 18. The belt 19 is preferably made with a smooth surface so that frictional contact with the fibers will be maintained at a minimum. Thus wear as by rubbing of the fibers against the surface of the belt will be minimized to result in long life and great durability of the unit 26.

Figure 1:
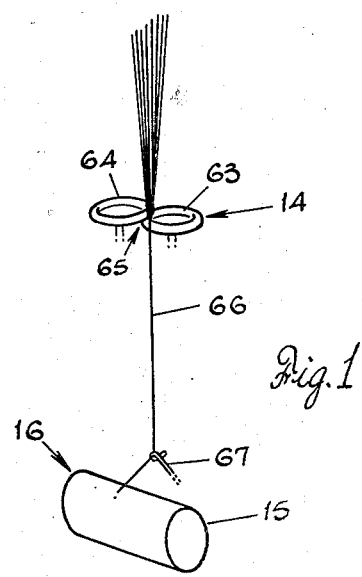
Fig. 1 is a perspective view of the coating device of the present invention interposed in operative relationship in the path of a plurality of continuous glass fibers for applying liquid material thereto.
Figure 3:
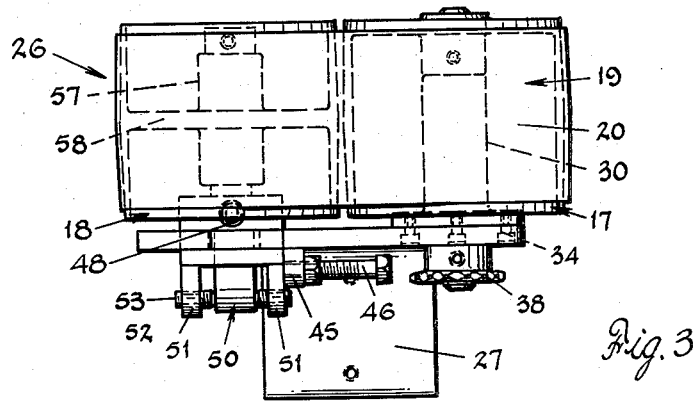
Fig. 3 is a plan view of the coating apparatus of the present invention.
Figure 4:
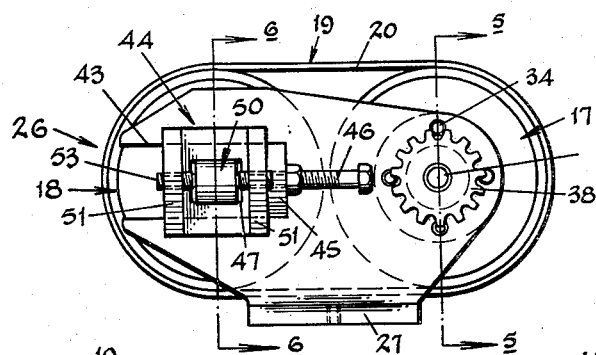
Fig. 4 is a side view of Fig. 3.

Operation of the method and apparatus of the present invention is best shown by reference to Fig. 1 where the spaced fibers 12 from the bushing 10 are drawn past the belt 19 as it passes around and over roll 17. The fibers pass in tangential contact with the belt surface while in spaced parallel relationship and thus each individual fiber is brought into contact with the film of liquid 24 carried upon the belt surface. Movement of the belt 19 as by means of the gear and motor unit 25 concomitantly causes replacement of the film 24 removed by the fibers 12 and provides lubrication between the belt and fibers.

A suitable gathering device 14 is positioned beneath the belt and roll unit 26 and in the embodiment shown comprises a pair of rotatable wheels 63 and 64 disposed in peripherally overlapping relationship to provide a nip 65 at the intersection of the peripheries, wherein the fibers are converged and guided into a strand 66. The gathering device 14 forms the subject of co-pending application Serial No. 499,086, filed April 4, 1955, assigned to the assignee of the present invention, to which reference is made. The strand 66 is wound upon a forming tube 15, rapidly rotated by means of a drive mechanism (not shown), and is caused to be laid upon the forming tube in a uniform manner by means of a traverser indicated by reference numeral 67.

Advantages arising from the present method and apparatus include positive and uniform coating of each of the individual fibers contained in the strand. Lubricant or size or both as may be comprised in the liquid coating material is thereby positively imparted to the fibers in the interior of the strand as well as those on the exterior of the strand.

Since a constantly moving surface is at all times being exposed to contact with the fibers, wear will be evenly distributed over the entire surface of the belt by virtue of the wiping action of the fibers thereacross. As compared to the woolen pads positioned upon a V-shaped bracket as heretofore used in the art for gathering and sizing glass fibers, it will be apparent that a device of greatly increased durability has been provided. The pad applicators heretofore used were subject to a harsh cutting action by the glass fibers and consequently required replacement at frequent intervals varying from a few minutes to a few hours of operation. The device and method of the present invention provide for the application of liquid materials to continuous glass fibers in an improved uniform manner over extended periods of trouble-free operation.

It is to be understood that the form of the invention herewith shown and described is to be taken as a preferred embodiment of the same, and various changes may be resorted to without departing from the spirit of the invention or the scope of the subjoined claims.

I claim:

1. Apparatus for applying a liquid material to the surface of a continuous fiber comprising: a base; a plurality of spaced rotatable pulleys; a continuous belt carried by said pulleys, said pulleys being positioned to support said continuous belt to provide a horizontal upper flight; means for rotating at least one of said pulleys to move said belt in a unilateral direction; a distributor positioned in contacting relationship with and across the upper surface of said upper flight; means for supplying a stream of liquid material to said upper surface in front of said distributor in a manner whereby said material is brought into contact with said distributor by the movement of said belt and is spread over the surface thereof as a uniform film by said distributor, and means for positioning said belt to tangentially contact the fiber with said uniform film during movement of said belt.

2. Apparatus for applying a liquid material to the surfaces of a continuous fiber including, a base, a pair of spaced pulleys rotatably journaled on said base, a continuous belt carried by said pulleys, said pulleys being positioned in space to support the flights of said continuous belt in generally horizontal planes to provide upper and lower flights, means for rotating said pulleys to move said belt in a unilateral direction, a felt pad, means for positioning said felt pad in contacting relationship across the upper surface of the upper flight of said belt, conduit means for supplying a stream of liquid material to the said upper surface in front of said felt pad whereby the liquid is brought into contact with the felt pad by the movement of the belt and is spread over the surface thereof as a uniform film by the felt pad, and means for interposing a portion of said belt carrying said uniform film of liquid in tangentially contacting relationship with the continuous fiber during movement of the same in a unilateral direction.

References Cited in the file of this patent

UNITED STATES PATENTS

| | | |
|---|---|---|
| 28,745 | Fuzzard | June 19, 1860 |
| 2,117,840 | Crew | May 17, 1938 |
| 2,252,204 | Reilly | Aug. 12, 1941 |
| 2,293,174 | Rooney et al. | Aug. 18, 1942 |
| 2,693,427 | Radtke et al. | Nov. 2, 1954 |
| 2,723,215 | Biefeld et al. | Nov. 8, 1955 |
| 2,873,718 | Brautigam | Feb. 17, 1959 |

FOREIGN PATENTS

| | | |
|---|---|---|
| 13,075 | Great Britain | 1905 |
| 320,477 | Great Britain | Oct. 17, 1929 |